(12) United States Patent
Osorio et al.

(10) Patent No.: US 12,428,569 B2
(45) Date of Patent: Sep. 30, 2025

(54) INKS FOR RECYCLABLE PLASTICS

(71) Applicant: SUN CHEMICAL CORPORATION, Parsippany, NJ (US)

(72) Inventors: Jarol Osorio, Charlotte, NC (US); Everett Garrish, Charlotte, NC (US)

(73) Assignee: Sun Chemical Corporation, Parsippany, NJ (US)

( * ) Notice: Subject to any disclaimer, the term of this patent is extended or adjusted under 35 U.S.C. 154(b) by 62 days.

(21) Appl. No.: 18/252,274

(22) PCT Filed: Nov. 19, 2021

(86) PCT No.: PCT/US2021/060032
§ 371 (c)(1),
(2) Date: May 9, 2023

(87) PCT Pub. No.: WO2022/109230
PCT Pub. Date: May 27, 2022

(65) Prior Publication Data
US 2024/0026172 A1    Jan. 25, 2024

Related U.S. Application Data

(60) Provisional application No. 63/117,072, filed on Nov. 23, 2020.

(51) Int. Cl.
*C09D 11/104* (2014.01)
*C08J 11/06* (2006.01)
*C09D 11/037* (2014.01)

(52) U.S. Cl.
CPC ............ *C09D 11/104* (2013.01); *C08J 11/06* (2013.01); *C09D 11/037* (2013.01); *C08J 2367/02* (2013.01)

(58) Field of Classification Search
CPC ..... C09D 11/104; C09D 11/037; C09D 11/03; C09D 11/103; C08J 11/06; C08J 2367/02; Y02P 20/582; Y02W 30/62
See application file for complete search history.

(56) References Cited

U.S. PATENT DOCUMENTS

| | | |
|---|---|---|
| 4,551,492 A | 11/1985 | Aerts |
| 4,590,265 A | 5/1986 | Bogan et al. |
| 5,338,785 A | 8/1994 | Catena et al. |
| 6,147,041 A | 11/2000 | Takahashi et al. |
| 2015/0010710 A1* | 1/2015 | December ............... B05D 1/02 427/415 |

FOREIGN PATENT DOCUMENTS

| | | |
|---|---|---|
| EP | 0 930 349 A1 | 7/1999 |
| EP | 2 061 848 | 5/2009 |
| JP | 2001 031899 A | 2/2001 |
| WO | WO 2004/104121 | 12/2004 |
| WO | WO 2009/029635 A2 | 3/2009 |
| WO | WO 2013/089968 A1 | 6/2013 |
| WO | WO 2014/008003 A2 | 1/2014 |
| WO | WO 2017/058846 A1 | 4/2017 |
| WO | WO 2017/205275 A1 | 11/2017 |
| WO | WO 2020/146240 A1 | 7/2020 |
| WO | WO2021081288 A1 | 4/2021 |

OTHER PUBLICATIONS

International Search Report issued in International Application No. PCT/US2021/060032, mailed Jun. 20, 2022.
Written Opinion of the International Searching Authority issued in International Application No. PCT/US2021/060032, mailed Jun. 20, 2022.
International Preliminary Report on Patentability (Chapter II of the Patent Cooperation Treaty) issued in International Application No. PCT/US2021/060032, mailed Apr. 27, 2023.

* cited by examiner

*Primary Examiner* — Jessica M Roswell
(74) *Attorney, Agent, or Firm* — Marian E. Fundytus; Amster Rothstein & Ebenstein LLP

(57) ABSTRACT

The present invention provides a two part ink or coating system, wherein Part A comprises one or more hydroxyl functional resins, one or more aminoplast crosslinkers, one or more polyester polyols, and one or more solvents; and Part B comprises an acid catalyst. Part A and Part B are combined just prior to application on a substrate. The ink or coating system of the invention is resistant to removal from polyolefin film substrates when subjected to a hot caustic wash. When applied as an overcoat (backing coat) over conventional inks printed on polyolefin film substrates, the ink or coating system of the invention also prevents removal of the conventional inks from the polyolefin substrate when subjected to a hot caustic wash. Advantageously, use of the ink and coating systems of the present invention reduces ink staining and contamination of recycled PET flakes.

7 Claims, 1 Drawing Sheet

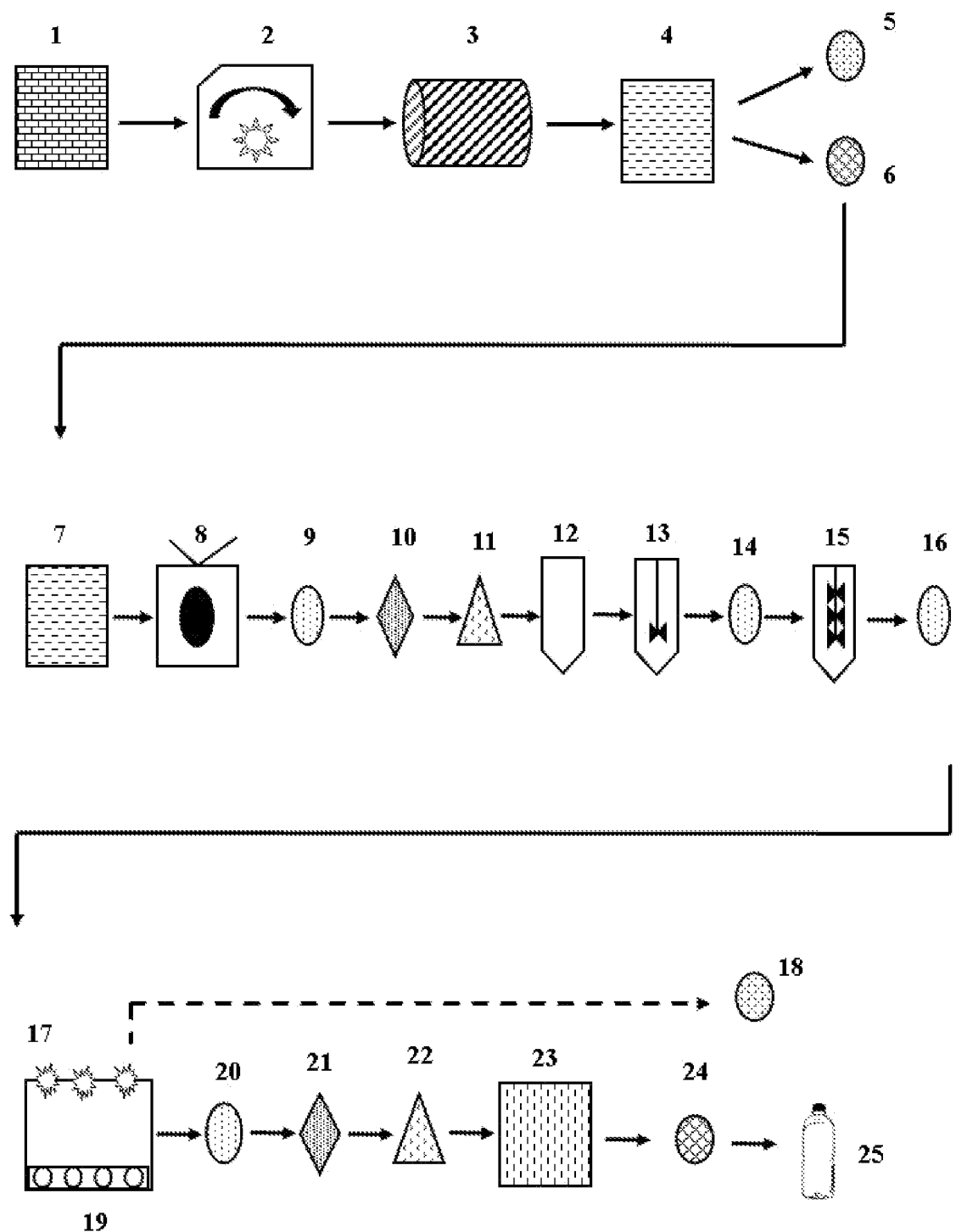

INKS FOR RECYCLABLE PLASTICS

CROSS REFERENCE TO RELATED APPLICATIONS

The present application is a § 371 National Phase application based on PCT/US2021/060032 filed Nov. 19, 2021, which claims the benefit of U.S. Provisional Application No. 63/117,072, filed Nov. 23, 2020, the subject matter of each of which is incorporated by reference in their entirety.

FIELD OF THE INVENTION

The present invention is related to ink and coating compositions that facilitate recycling of plastic substrates. The inks and coatings of the invention are applied to labels, such as polymeric films applied to plastic articles, for example polyethylene terephthalate (PET) bottles. The inks and coatings of the invention are not removed from the label by a hot caustic wash, do not dissolve in the hot caustic wash, and thus do not contaminate the recycled plastic article.

BACKGROUND OF THE INVENTION

Full body shrink sleeve labels are presently a very popular choice for use on food and beverage containers and consumer products, such as polyethylene terephthalate (PET) containers. Shrink sleeve labels are appealing and convenient to the consumer and commercially attractive for the brand owners. However, while seen as a success story by many, they present difficulties for the recycling industry. The shrink sleeve labels are particularly a problem for recycling of PET bottles, where the bottles and the labels contained thereon enter the recycle process together, and are very difficult to separate downstream. In addition, if the inks printed on the labels dissolve in the hot caustic wash typically used to remove the labels, the inks can contaminate the wash solution, which in turn can cause staining of the recycled polyester flake. This tinting of the flake downgrades its quality, thereby reducing the value of the recycled PET flake. To further detriment, this can lead to increased wastewater treatment cost and potential environmental issues with municipal water sources and the Environmental Protection Agency (EPA).

Of the films typically used to produce full body shrink sleeve labels, polyethylene terephthalate glycol (PETG) is often the most problematic for recyclers due to its tendency to sink along with the PET flake from the bottles in the wash water step. The PET flake is then prone to clumping, making it very difficult to separate and remove from the process.

As a response to this problem, a newly developed polymer called crystallizable PETG resin has been shown to be fully recyclable together with the PET flake from the bottles. For this process, the inks printed on the crystallizable PETG film preferably are completely removed during the hot caustic (NaOH solution) wash cycle in order for the simultaneously recycled PET bottle and crystallizable PETG label film to be of high quality (minimal tinting, good physical properties e.g. resistance properties).

Alternatively, producers of polyolefin based films, such as polyethylene or polypropylene, found an opportunity to offer a different solution to this problem, by designing "floatable" polyolefin based shrink films. The floatable polyolefin films can be used as full body shrink sleeves on PET containers, and do not interfere with the recycling process because they float in water, and can be easily separated from the PET flake during the sink/float steps of the process. Therefore, the inks and coatings printed on these floatable films preferably remain on the label to prevent contamination of the caustic wash and the recycled PET flake.

The current state of the art of ink technology is that it is not resistant to NaOH solutions, therefore it solubilizes in the hot caustic wash used in the recycling processes. The hot caustic washes are typically 85° C. water with up to 3% NaOH and non-ionic surfactant with detergent properties. The caustic-soluble ink chemistries are undesirable because they stain the recycled PET flake and severely contaminate the wash waters.

EP 2 987 822 discloses a method for continuous recovery of printed thin-walled PETG substrates, wherein the inks are removed from the substrate during the recycling process using a treating composition. The treating composition is an aqueous azeotrope of an organic low molecular weight, polar solvent selected from the group consisting of ketones, aldehydes, alcohols, and esters. Exemplary binder systems capable of being removed with the treatment composition are styrene acrylic copolymers, or polyamides.

U.S. Pat. No. 6,147,041 describes a removable ink composition comprising: (A) a urethane resin and/or an acrylic resin; and (B) one or more substances selected from the group consisting of styrene-acrylic acid copolymers, styrene-maleic acid resins, rosin-maleic acid resins and phenol resins as main components of a vehicle. The removable ink may further comprise a cellulose resin as a component of the vehicle. An organic solvent is an essential component. The inks are removed from plastic articles with an aqueous alkali solution.

WO 2021/081288 discloses ink compositions that are removed from plastic substrates, such as labels, in a hot caustic wash solution. The inks are resistant to dissolving in the hot caustic wash solution when removed from the plastic substrate, and precipitate, wherein the precipitate is filtered out of the hot caustic solution.

U.S. Pat. No. 5,338,785 discloses flexible packaging printing inks comprising a polyethyleneglycol methacrylate/polyamide copolymer resin, a pigment, a solvent, and cellulose acetate butyrate.

The inks may contain a ketone resin. The resistance to alkali solutions was not tested, nor discussed.

EP 2 061 848 describes an inkjet ink composition comprising organic solvents, solvent-soluble binder resins, and water-insoluble quinone dye. The binder resins contain functional groups that can interact with the quinone dye, such as aromatic groups or polar functional groups such as hydroxyl and/or carboxyl groups. The binder resins include cellulosic resins and ketone resins. The resistance to alkali solutions was not tested, nor discussed.

WO 2019/204994 discloses alcohol-soluble printing ink compositions comprising polyurethane binder, solvent, and a cellulose alkylate (as an anti-blocking agent).

WO 2004/104121 discloses aminoplast crosslinkers for crosslinking coating systems containing carboxyalkylcellulose esters. The crosslinking of the compositions is catalyzed with PTSA. The reactive functionalities of the resins include hydroxyl, carboxyl, epoxy, and amine functionalities.

U.S. Pat. No. 4,551,492 discloses a polyester coating composition consisting essentially of: a binder which consists essentially of a polyester resin; a partially butylated melamine crosslinker resin; a polyurea plasticizer; polyethylene vinyl acetate copolymer dispersion; and a mixture of a low viscosity cellulose acetate butyrate and a high viscosity cellulose acetate butyrate. The goal was to increase the solids content of the composition from 14% to 18%. This was achieved by decreasing the amount of cellulose acetate butyrate, and increasing the amount of polyester resin plus melamine crosslinker, with more crosslinker being used relative to polyester resin. The composition requires very high amounts of melamine crosslinker to provide satisfactory properties.

Therefore, there is a need to provide a solution where the inks stay permanently on the label film, as opposed to being removable. Thus, when the label film is removed from the plastic bottle, the ink is removed as well, and does not stain or otherwise contaminate the recycled flake that is derived from the plastic bottle.

SUMMARY OF THE INVENTION

The present invention provides ink and coating compositions that, when applied to a label which is placed on a plastic article (e.g. plastic bottle), is not removed from the label during the hot caustic wash of the recycling process. The present invention also provides a method for applying the ink or coating composition to the label substrate. When applied as a topcoat or overprint varnish over other inks printed on the label, the composition of the invention also prevents removal of the other inks from the label.

In a particular aspect, the present invention provides a two part ink or coating system, comprising:
  (a) Part A, wherein part A is a composition comprising:
    i. 5 wt % to 40 wt % one or more hydroxyl functional resins, based on the total weight of the Part A composition, wherein at least one resin is a cellulose acetate butyrate;
    ii. 0.5 wt % to 10 wt % one or more aminoplast crosslinkers, based on the total weight of the Part A composition;
    iii. 0.5 wt % to 10 wt % one or more polyester polyols, based on the total weight of the Part A composition; and
    iv. 5 wt % to 50 wt % one or more solvents, based on the total weight of the Part A composition; and
  (b) Part B, one or more acid catalysts.

In another aspect, the present invention provides a method of preparing a printed label, comprising:
  (a) providing a floatable polyolefin film substrate;
  (b) printing and drying or curing one or more inks on the substrate;
  (c) applying the ink or coating system of the invention on top of the one or more printed inks; and
  (d) drying or curing the ink or coating system.

In preferred embodiments, the label is a floatable polyolefin film. In other embodiments, the label is applied to a plastic article, such as a container or bottle, wherein the article is recyclable. In a preferred embodiment, the plastic article is a PET bottle.

BRIEF DESCRIPTION OF THE DRAWINGS

FIGURE: The FIGURE is a flow chart illustrating a typical PET recycling process.

DETAILED DESCRIPTION OF THE INVENTION

The present invention provides ink and coating compositions that are resistance to removal by a hot caustic solution, such as that used in the plastic recycling process. The inventive inks and coatings are not removed, and when used as a coating (e.g. backing white coating over conventional printed inks on a transparent shrink film) the inks and coatings of the present invention prevent removal of the inks over which they are printed during the recycling process. As a result, the recycled PET flakes so obtained are not stained or contaminated by the ink.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong.

All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise. Also, when it is clear from the context in which it is used, "and" may be interpreted as "or," such as in a list of alternatives where it is not possible for all to be true or present at once.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes the end points, all values within that range, and all narrower ranges within that range, whether specifically recited or not.

Throughout this disclosure, all parts and percentages are by weight (wt % or mass % based on the total weight) and all temperatures are in ° C. unless otherwise indicated.

As used herein, "substrate" means any surface or object to which an ink or coating can be applied. Substrates include, but are not limited to, cellulose-based substrates, paper, paperboard, fabric (e.g. cotton), leather, textiles, felt, concrete, masonry, stone, plastic, plastic or polymer film, spunbond non-woven fabrics (e.g. consisting of polypropylene, polyester, and the like) glass, ceramic, metal, wood, composites, combinations thereof, and the like. Substrates may have one or more layers of metals or metal oxides, or other inorganic materials. Particularly preferred are non-woven substrates. For the purposes of the present invention, plastic substrates, particularly shrink films and recyclable plastic substrates, are the preferred substrates.

As used herein, the term "article" or "articles" means a substrate or product of manufacture. Examples of articles include, but are not limited to: substrates such as cellulose-based substrates, paper, paperboard, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like. For the purposes of the present invention, plastic articles, particularly shrink films and recyclable plastic substrates, are the preferred substrates.

As used herein, "inks and coatings," "inks," and "coatings" are used interchangeably, and refer to compositions of the invention, or, when specified, compositions found in the prior art (comparative). Inks and coatings typically contain resins, solvent, and, optionally, colorants. Coatings are often thought of as being colorless or clear, while inks typically include a colorant.

As used herein, "hot caustic wash" or "hot caustic solution" refers to an aqueous solution comprising water and a base, heated to about 85° C. to 90° C. For example, the hot caustic wash may contain water and about 3% to 20% sodium hydroxide (NaOH).

When the terms "consist of", "consists of" or "consisting of" is used in the body of a claim, the claim term set off with "consist of", "consists of" and/or "consisting of" is limited to the elements recited immediately following "consist of", "consists of" and/or "consisting of", and is closed to unrecited elements related to that particular claim term. The term 'combinations thereof', when included in the listing of the recited elements that follow "consist of", "consists of" and/or "consisting of" means a combination of only two or more of the elements recited. For example, if a claim recites "a solvent selected from the group consisting of alcohols, ketones, acetates, and combinations thereof" this means that only those solvents recited can be included i.e. "combinations thereof" means combinations of only alcohols, ketones, and acetates.

Recycling Process

The recycling process is illustrated in the FIGURE. A general description of a typical mechanical recycling process of PET from post-consumer bottle feedstock is:

(a) Collection of post-consumer PET bottles with labels from curbside or municipal recycling facility.
(b) Separation of PET bottles with labels from compacted bale in a mechanical singulator.
(c) First cleaning of whole bottles with labels in a mild caustic/detergent water bath.
(d) NTRF (near intra-red fluorescence) or manual sorting of PET from non-PET contaminants.
(e) Wet or dry mechanical grinding of whole bottles with labels.
(f) Deep cleaning in high shear tank with hot caustic water+detergent.
(g) Sink/float separation tank to remove the light weights (caps, lids, rings, and polyolefin-based labels and closures that float in water) from the heavy weights (PET flake from bottles).
(h) Dewater/drying/elutriation of cleaned recycled PET flake.

The recycled PET flake is then converted to pellets, and can be used in applications wherein PET is used, such as to make new PET bottles.

Referring to the FIGURE, a bale of mixed plastics (1), is run through a singulator (2) to separate the different types of plastic. PET bottles are subjected to a whole bottle wash in a mild caustic/detergent water bath (3), which typically removes ink. The clean PET bottles are sorted either by NIRF or manual sorting (4). The sorting separates non-PET materials into a mixed bale (5). Whole PET bottles (clear/blue, green) are separated (6). Note that the labels and caps are still on the bottles at this stage. The PET bottles are again manually sorted (7), and run through a wet or dry grinder (8), to produce mixed flakes (i.e. the PET flakes from the bottle, and flakes from the caps and labels). After grinding, the mixed flakes are dewatered (9) and dried (10). At this point, the mixed flakes may be subjected to an optional elutriation step to separate the mixed flakes by size (11). The mixed flakes are transferred to a dirty silo (12), then are subjected to a pre-rinse (13). The mixed flakes are dewatered (14). The mixed flakes are then transferred to a high shear wash reactor (15) where they are subjected to a hot caustic wash (caustic water+detergent), which is designed to remove any ink remaining on the flakes. The washed mixed flakes are then dewatered (16), and transferred to a sink/float tank (17). Non-PET flakes are lighter than the PET flakes (floatable stream), float to the top of the tank and are removed (18). The PET flakes (19) sink to the bottom of the sink/float tank, and are processed through a dewatering (20) and drying (21). The PET flakes are optionally elutriated (22) to separate the PET flakes by size. The PET flakes are subjected to an optional flake sort (23). The clean PET flake stream (24) can be used to make other products, such as plastic bottles (25).

Ink and Coating Compositions and Uses Thereof

The present invention provides ink and coating compositions that are resistant to removal from a substrate when subjected to a hot caustic wash, such as during recycling of plastic articles. The ink and coating compositions of the invention also do not dissolve in a hot caustic solution. Consequently, contamination and staining of the recycled PET flakes is reduced or eliminated by use of the inks and coatings of the present invention. When used as a topcoat or overprint varnish applied on top of other inks, the compositions of the invention also prevent removal of the other inks from the substrate.

The ink and coating compositions of the present invention are provided as a two part system. The ink and coating systems of the present invention are based on a two part acid catalyzed/aminoplast crosslinked chemistry, in combination with one or more hydroxyl functional resins. The Part A composition comprises one or more hydroxyl functional resins, one or more aminoplast crosslinkers, one or more polyester polyols, and one or more solvents. In preferred embodiments, at least one hydroxyl functional resin is a cellulose acetate butyrate (CAB) resin. Part B comprises one or more acid catalysts that are reactive with the aminoplast crosslinkers.

The Part A composition comprises one or more hydroxyl functional resins. Suitable resins include, but are not limited to, acrylics, polyester diols, alkyds, polyurethanes, cellulose acetate butyrates (CAB), cellulose acetate propionates (CAP), ketone formaldehydes and combinations thereof. In preferred embodiments, at least one resin is CAB.

In certain embodiments, more than one CAB resin is included. In some embodiments, CAB resins having different viscosities may be used in different amounts to adjust the viscosity of the composition. For example, if a composition contains a first CAB resin, and the viscosity of the composition is too high for its intended purpose (such as flexographic printing), then a second CAB resin, having a viscosity that is lower than the first CAB resin, can be added in an amount sufficient to adjust the viscosity accordingly. One of ordinary skill in the art will choose CAB resins of suitable viscosities to achieve the desired viscosity for the print method being used.

The Part A composition of the present invention typically comprises about 5 wt % to about 40 wt % one or more hydroxyl functional resins, based on the total weight of the Part A composition. The amount of the one or more hydroxyl functional resins is the dry weight (i.e. the resin solids). For example, the Part A composition may comprise hydroxyl functional resins in an amount of about 5 wt % to about 30 wt %; or about 5 wt % to about 20 wt %; or about 5 wt % to about 10 wt %; or about 10 wt % to about 40 wt %; or about 10 wt % to about 30 wt %; or about 10 wt % to about 20 wt %; or about 20 wt % to about 40 wt %; or about 20 wt % to about 30 wt %; or about 30 wt % to about 40 wt %. In certain embodiments, a resin may be provided as a solution or dispersion, and the amount of solution or dispersion is adjusted to arrive at the desired amount of resin solids. For example, if a hydroxyl functional resin is supplied as a dispersion having 40% solids, then the amount of dispersion that would be added is 12.5 wt % of the dispersion to arrive at 5 wt % of hydroxyl functional resin.

The Part A composition of the present invention comprises one or more aminoplast crosslinkers. Suitable aminoplast crosslinkers include, but are not limited to, melamine-based resins, urea-based resins, and combinations thereof. The Part A composition of the present invention typically comprises about 0.5 wt % to 10 wt % one or more aminoplast crosslinkers, based on the total weight of the Part A composition. The amount of the one or more aminoplast crosslinkers is the weight of the actual crosslinker. For example, the Part A composition may contain aminoplast crosslinkers in an amount of about 0.5 wt % to 5 wt %, or about 0.5 wt % to about 1 wt %. In certain embodiments, the crosslinker may be provided as a solution or dispersion, and the amount of solution or dispersion is adjusted to arrive at the desired amount of the crosslinker itself.

The Part A composition of the invention comprises one or more polyester polyols. Suitable polyester polyols include, but are not limited to, K-Flex 188, K-Flex 148, K-Flex 171-90, and combinations thereof (all from King Industries). The Part A composition of the invention typically comprises about 0.5 wt % to about 10 wt % polyester polyols, based on the total weight of the Part A composition. For example, the Part A composition may contain polyester polyols in an amount of about 0.5 wt % to 5 wt %, or about 0.5 wt % to about 1 wt %.

The Part A composition of the invention comprises one or more solvents. Suitable solvents include, but are not limited to, alcohols, aliphatic hydrocarbons, cyclic hydrocarbons, aromatic hydrocarbons, ketones, aldehydes, ethers, esters, and combinations thereof. The Part A composition of the present invention typically comprises about 5 wt % to about 50 wt % one or more solvents, based on the total weight of the Part A composition. For example, the Part A composition may contain solvents in an amount of about 5 wt % to about 40 wt %; or about 5 wt % to about 30 wt %; or about 5 wt % to about 20 wt %; or about 5 wt % to about 10 wt %; or about 10 wt % to about 50 wt %; or about 10 wt % to about 40 wt %; or about 10 wt % to about 30 wt %; or about 10 wt % to about 20 wt %; or about 20 wt % to about 50 wt %; or about 20 wt % to about 40 wt %; or about 20 wt % to about 30 wt %. The Part A composition is preferably contains no water. However, a small amount of water may be present as an impurity in the materials used to prepare the compositions. When water is present, it is preferably present in an amount of less than 0.5 wt %, based on the total weight of the Part A composition.

The Part A compositions of the present may further comprise one or more non-hydroxyl functional resins. Non-hydroxyl functional resins include, but are not limited to, polyesters, polyurethanes, polyamides, ketone resins, aldehyde resins alkyd resins, phenol-formaldehyde resins, rosin resins, hydrocarbon resins, and combinations thereof. Such resins can help improve pigment wetting, gloss, rheology, chemical resistance, anti-blocking properties, and flexibility. When present, the non-hydroxyl functional resins are typically present in an amount of about 0.5 wt % to about 40 wt %, based on the total weight of the Part A composition. The amount of the non-hydroxyl functional resins is the dry weight (i.e. resin solids). For example, the Part A composition may contain non-hydroxyl functional resins in an amount of about 0.5 wt % to about 30 wt %; or about 0.5 wt % to about 20 wt %; or about 0.5 wt % to about 10 wt %; or about 0.5 wt % to about 1 wt %; or about 1 wt % to about 40 wt %; or about 1 wt % to about 30 wt %; or about 1 wt % to about 20 wt %; or about 1 wt % to about 10 wt %.

The Part A compositions of the present invention may further comprise one or more extenders. Suitable extenders include, but are not limited to, clay, talc, calcium carbonate, magnesium carbonate, silica, and combinations thereof. When present, the extenders are typically present in an amount of about 0.5 wt % to about 10 wt %, based on the total weight of the Part A composition. For example, the Part A composition may contain extenders in an amount of about 0.5 wt % to 5 wt %, or about 0.5 wt % to about 1 wt %

The Part A compositions of the present invention may further comprise one or more additives. Suitable additives include, but are not limited to, adhesion promoters, silicones, light stabilizers, optical brighteners, de-gassing additives, ammonia, flow promoters, defoamers, antioxidants, stabilizers, surfactants, dispersants, plasticizers, rheological additives, waxes, silicones, and combinations thereof. When present, the additives are each individually present in an amount of about 0.1 wt % to about 5 wt %, based on the total weight of the Part A composition.

The Part A compositions of the present invention may further comprise one or more colorants. Suitable colorants include, but are not limited to, organic or inorganic pigments and dyes. The dyes include but are not limited to azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired. Colorants are typically provided as colorant dispersions. When present, colorant dispersions are typically included in the Part A compositions of the present invention in an amount of about 35 wt % to about 50 wt %, based on the total weight of the Part A composition. For example, colorant dispersions may be present in an amount of about 35 wt % to about 45 wt %; or about 35 wt % to about 40 wt %; or about 40 wt % to about 50 wt %; or about 40 wt % to about 45 wt %; or about 45 wt % to about 50 wt %.

The Part B composition comprises one or more acid catalysts. The acid catalysts react with the aminoplast crosslinker. Suitable acid catalysts include, but are not limited to, para-toluene sulfonic acid (p-TSA), dodecylbenzene sulfonic acid (DDBSA), dinonylnaphthalene sulfonic acid (DNNSA), dinonylnaphthalene di-sulfonic acid (DNNDSA), acid phosphates, carboxylic acids, and combinations thereof.

Part A and Part B are kept separate, and mixed just prior to use. The Part A composition and Part B acid catalysts are mixed in a ratio of Part A:Part B of about 90:10 to 95:5.

In preferred embodiments, the inks and coatings of the invention are applied on label substrates that are used on plastic, preferably PET, bottles. In certain embodiments, the label substrates are shrink wrap films. In preferred embodiments, the shrink wrap films are floatable polyolefin films. Floatable films are easily separated from the PET flakes during recycling.

The inks and coatings of the present invention are not removed from the label substrates during the recycling process. They remain on the film, and are separated from the wash solution along with the floatable label substrate. Therefore, they do not dissolve in the hot caustic wash, and do not contaminate either the wash solution or the PET flakes. Use of the inks and coatings of the present invention thus enables recovery of clean recycled PET flakes.

In certain embodiments, the inks and coatings of the present invention are used as backing compositions to prevent removal of other inks from the label substrates. In these embodiments, any colored inks are first printed on the substrate. Then the colored inks are overprinted with an ink or coating of the present invention, preferably at 100% coverage of the colored inks. The colored inks that are overprinted with the ink or coating of the present invention are thus protected from the hot caustic wash during recycling, and are not removed from the label substrate. Therefore, the colored inks are also separated from the wash solution along with the floatable substrate during recycling.

When used as backing compositions (printed on top of other inks as a topcoat/overprint varnish), the inks and coatings of the invention can be white or clear. White backing compositions contain a white pigment, such as titanium dioxide ($TiO_2$) in the Part A composition. White backing compositions typically contain TiO2 in an amount of about 10 wt % to 40 wt %, based on the total weight of the Part A composition. When the backing compositions do not contain a white pigment, they are clear coatings.

To confirm that ink was not removed from the label and/or dissolved in the hot caustic wash during a simulated recycling process, the color of PET flakes ground with printed labels ($PET_{label}$) was compared to the color of clean PET flakes subjected to the simulated recycling process without the labels ($PET_{clean}$) i.e. whether or not the $PET_{label}$ was a spectral match to the $PET_{clean}$. The CIELAB color values L*a*b* as defined in CIELAB color space by the Commission Internationale de l'Eclairage (CIE), in 1976, were measured using a spectrophotometer (see Examples), where:

L*=lightness value;

a*=red/green value, where positive values indicate amounts of red, and negative values indicate amounts of green;

b*=yellow/blue value, where positive values indicate amounts of yellow, and negative values indicate amounts of blue.

The difference in the color values of the PET flakes, denoted as $\Delta L^*$, $\Delta a^*$, and $\Delta b^*$, were calculated, where:

$$\Delta L^* = L^*_{label} - L^*_{clean}$$

$$\Delta a^* = a^*_{label} - a^*_{clean}$$

$$\Delta b^* = b^*_{label} - b^*_{clean}$$

Target values for color change of the $PET_{label}$ flakes versus the control $PET_{clean}$ flakes is established by the Association of Plastics Recyclers (APR). In certain embodiments, the $PET_{label}$ is considered to be a spectral match to the $PET_{clean}$ when:

$$\Delta L^* = 0 \pm 10.0; \text{ or } 0 \pm 7.5$$

$$\Delta a^* = 0 \pm 2.5; \text{ or } 0 \pm 2.0$$

$$\Delta b^* = 0 \pm 2.5; \text{ or } 0 \pm 2.0$$

In preferred embodiments, as established by the APR, the $PET_{label}$ is considered to be a spectral match to the $PET_{clean}$ when:

$$\Delta L^* = 0 \pm 5.0$$

$$\Delta a^* = 0 \pm 1.5$$

$$\Delta b^* = 0 \pm 1.5$$

Most preferably, $\Delta L^*$, $\Delta a^*$, and $\Delta b^*$ are zero.

The two part ink and coating compositions of the invention are suitable for flexographic and rotogravure printing. However, it is to be understood that other types of printing could also be used.

EXAMPLES

The invention is further described by the following non-limiting examples, which further illustrate the invention, and are not intended, nor should they be interpreted to, limit the scope of the invention.

Example 1. Two-Component Backing White Coating

A composition of the invention was prepared as a two component backing white coating composition according to the formulation shown in Table 1.

TABLE 1

| Two-component backing white composition | |
|---|---|
| Part A | |
| | wt % |
| n-Propyl Alcohol | 24.5 |
| n-Propyl Acetate | 7.3 |
| Ethyl Alcohol | 10.45 |
| ketone formaldehyde resin | 10.45 |
| CAB-381-0.1 resin | 3.6 |
| Titanium Dioxide | 30.9 |
| Solus 2100 resin | 1.7 |
| CYMEL XW 3106:PAIL | 4.5 |
| HMW Polyethylene Wax | 1.3 |
| ATBC Plasticizer | 1.7 |
| Polyester Diol | 3.6 |
| Total | 100 |

TABLE 1-continued

Two-component backing white composition

Part A wt %

Part B

Dodecyl Benzene Sulfonic Acid
(DDBSA) catalyst

CAB-381-0.1 is a CAB resin having a viscosity of 0.38 Poise in an acetone/alcohol solvent Solus 2100 is a CAB resin having a viscosity of about 0.038 Poise in an acetone/alcohol solvent Part A and Part B were blended at a ratio of 95:5 just prior to printing.

Compositions were mixed using an Ultra Turrax T50 Basic Mixer, at 3000-4000 rpm, for 15-20 minutes.

Note that although Example 1 was formulated for use as a flexographic ink, it is well understood that the backing white could be reformulated to have a viscosity and drying profile suited to other printing methods, such as, for example, gravure printing.

Example 2. Assess PET Flakes from the Simulated Recycling Process

Printed labels and PET flakes were subjected to a simulated recycling process as described below. The efficacy of the compositions of the invention to reduce or eliminated ink removal from printed labels was assessed by measuring the color values as described below.

Methods

Printing

Individual yellow, magenta, cyan, and black printed labels were prepared by printing yellow, magenta, cyan, and black Solvawash inks (Sun Chemical Corp.) onto Taghleef polyolefin floatable shrink films. Solvawash GR inks (see formulation of examples 1 to 7 of WO 2021/081288) are suitable for gravure printing, and were applied on Taghleef SHAPE 360 shrink film. Solvawash FL inks (see examples 15 and 16 of WO 2021/081288) are suitable for flexographic printing, and were applied on Taghleef SHAPE 360 shrink film. Inks were applied using a Harper bladed hand proofer, with a 360 lpi/6.0 BCM anilox cylinder. Inks were dried by a stream of hot air from a laboratory heat gun for 5 seconds.

After the inks were dry, inventive sample labels were then overprinted with the backing white coating composition of Example 1, using the same hand proofer as described above. The coating was dried, and the inventive sample labels subjected to simulated recycling with PET flakes.

Simulation of Recycling

Labels and PET flakes were subjected to a simulation of a recycling process as described as follows:

(1) Three (3) g of the labels were cut into 0.25 inch by 0.25 inch pieces and blended with 100 g of clean PET flake.

(2) 200 ml of caustic solution, containing 3 g of sodium hydroxide (NaOH) and 0.6 g of Triton X-100 surfactant, was added to a beaker, and heated on a hot plate to a temperature of 85° C.

(3) When the caustic solution reached 85° C., the mixture of label and PET flakes was added into the hot caustic solution and stirred for 15 minutes at 1000 rpm with a benchtop mixer.

(4) After 15 minutes, the beaker was removed from the heat source, and the solution was subjected to a sink/float step. During the sink/float step the label flakes floated to the top, and were removed. The remaining hot caustic solution with PET flakes was then strained through a filter (sieve or organdy cloth). The solution was collected in a glass jar. The PET flakes were collected in the filter.

(5) The PET flakes were rinsed until the rinse was clear or minimally discolored, and the flakes were allowed to dry. PET flakes that were subjected to the simulated recycling with labels overprinted with the Example 1 backing white are identified as $PET_{label}$.

(6) Control PET flakes were clean PET flakes subjected to the simulated recycling process, but without the label pieces (i.e. only PET flakes), and are identified as $PET_{clean}$.

The color of the PET flakes was assessed as described below.

Assessing Color Change

The color values were measured for the inventive $PET_{label}$ flakes, control $PET_{clean}$ flakes as follows:

(1) PET flakes were placed on the back of a Leneta Card (non-fluorescent white paper), and pressed flat under the spectrophotometer.

(2) The color of the PET flakes was measured using an X-Rite eXact Advanced XP spectrophotometer, set at M0, illuminant D65, at 10° angle. The L*a*b* values of each of the inventive and control PET flakes were measured, and ΔL*, Δa*, and Δb*, compared to control PET flakes ($PET_{clean}$), was calculated for the inventive $PET_{label}$) as described above.

The delta values for the inventive PET flakes are the difference between the colorimetric data of the $PET_{label}$ flakes and the control $PET_{clean}$ flakes, and were calculated using the following formulae:

$$PET_{label}\Delta L^* = PET_{label}L^* - PET_{clean}L^*$$

$$PET_{label}\Delta a^* = PET_{label}a^* - PET_{clean}a^*$$

$$PET_{label}\Delta b^* = PET_{label}b^* - PET_{clean}b^*$$

Table 2 show the ΔL*, Δa*, and Δb* for PET flakes obtained from samples where PET flakes were combined with labels printed with Solvawash GR inks.

TABLE 2

ΔL*, Δa*, and Δb* values of recycled
PET flakes printed with Solvawash GR inks

| Ink | Color value | Δ value $PET_{label}$ vs $PET_{clean}$ |
|---|---|---|
| Solvawash GR Magenta | L* | 0.64 |
|  | a* | 0.06 |
|  | b* | −0.56 |
| Solvawash GR Cyan | L* | −0.55 |
|  | a* | −0.02 |
|  | b* | −0.71 |
| Solvawash GR Yellow | L* | 0.61 |
|  | a* | −0.09 |
|  | b* | −0.53 |
| Solvawash GR Black | L* | −0.21 |
|  | a* | −0.06 |
|  | b* | −0.56 |

Table 3 show the ΔL*, Δa*, and Δb* for PET flakes obtained from samples where PET flakes were combined with labels printed with Solvawash FL inks.

TABLE 3

*ΔL\*, Δa\*, and Δb\* values of recycled PET flakes printed with Solvawash FL inks*

| Ink | Color value | Δ value PET$_{label}$ vs PET$_{clean}$ |
|---|---|---|
| Solvawash FL Magenta | L* | −0.73 |
|  | a* | 0.16 |
|  | b* | −0.14 |
| Solvawash FL Cyan | L* | −0.97 |
|  | a* | 0.01 |
|  | b* | −0.20 |
| Solvawash FL Yellow | L* | −0.68 |
|  | a* | −0.10 |
|  | b* | −0.34 |
| Solvawash FL Black | L* | −0.08 |
|  | a* | −0.04 |
|  | b* | −0.42 |

The data in Tables 2 and 3 exhibit the advantageous small color change of the PET$_{label}$ flakes compared to the PET$_{clean}$ flakes. The PET$_{label}$ flakes are a close spectral match to PET$_{clean}$ flakes recycled without any printed labels, indicating that the inks from the printed labels were not removed and/or not dissolved in the hot caustic wash when the inks were overprinted with a composition of the present invention. Surprisingly, the ΔL\*, Δa\*, and Δb\* values for the PET$_{label}$ flakes was considerably lower than the aforementioned target values for color change as established by the APR.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A two part ink or coating system, comprising:
    (a) Part A, wherein part A is a composition comprising:
        i. 5 wt % to 40 wt % one or more hydroxyl functional resins, resin, based on the total weight of the Part A composition, wherein at least one resin is a cellulose acetate butyrate resin;
        ii. 0.5 wt % to 10 wt % one or more aminoplast crosslinkers, based on the total weight of the Part A composition;
        iii. 0.5 wt % to 10 wt % one or more polyester polyols, based on the total weight of the Part A composition; and
        iv. 5 wt % to 50 wt % one or more solvents, based on the total weight of the Part A composition; and
    (b) Part B, one or more acid catalysts, wherein Part A and Part B are blended in a ratio of 90:10 to 95:5.

2. The ink or coating system of claim 1, wherein the one or more acid catalysts are selected from the group consisting of para-toluene sulfonic acid, dodecylbenzene sulfonic acid, dinonylnaphthalene sulfonic acid, dinonylnaphthalene disulfonic acid, acid phosphates, carboxylic acids, and combinations thereof.

3. The ink or coating system of claim 1, wherein the one or more hydroxyl functional resins are selected from the group consisting of acrylics, polyester diols, alkyds, polyurethanes, cellulose acetate butyrates, cellulose acetate propionates, ketone formaldehydes and combinations thereof.

4. The ink or coating system of claim 1, wherein the one or more aminoplast crosslinkers are selected from the group consisting of melamine-based resins, urea-based resins, and combinations thereof.

5. The ink or coating system of claim 4, wherein the one or more aminoplast crosslinkers are selected from the group consisting of melamine-formaldehyde resins, urea-formaldehyde resins, and combinations thereof.

6. The ink or coating system of claim 1, wherein the Part A composition further comprises one or more additives selected from the group consisting of adhesion promoters, silicones, light stabilizers, optical brighteners, de-gassing additives, ammonia, flow promoters, defoamers, antioxidants, stabilizers, surfactants, dispersants, plasticizers, rheological additives, waxes, silicones, and combinations thereof; wherein each additive is independently present in an amount of 0.1 wt % to 5 wt %, based on the total weight of the Part A composition.

7. The ink or coating system of claim 1, wherein the Part A composition further comprises 10 wt % to 40 wt % titanium dioxide.

* * * * *